US008295349B2

(12) United States Patent
Tikiya et al.

(10) Patent No.: US 8,295,349 B2
(45) Date of Patent: Oct. 23, 2012

(54) METHODS AND APPARATUSES FOR VIDEO COMPRESSION INTRA PREDICTION MODE DETERMINATION

(75) Inventors: Vibhor Tikiya, Mumbai (IN);
Pallapothu Shyam Sundera Bala Koteswara Gupta, Bangalore (IN);
Kopparapu Suman, Bangalore (IN)

(73) Assignee: Flextronics AP, LLC, Broomfield, CO (US)

( * ) Notice: Subject to any disclaimer, the term of this patent is extended or adjusted under 35 U.S.C. 154(b) by 1668 days.

(21) Appl. No.: 11/439,879

(22) Filed: May 23, 2006

(65) Prior Publication Data
US 2007/0274380 A1 Nov. 29, 2007

(51) Int. Cl.
*H04B 1/66* (2006.01)
*G06K 9/36* (2006.01)
(52) U.S. Cl. .................................. 375/240.12; 382/239
(58) Field of Classification Search .................. 348/398, 348/400, 401, 411; 375/240, 240.12, 240.24, 375/240.01, 240.2, 240.03, 240.25, 240.18; 382/232, 239, 56, 240, 233, 248, 249, 253, 382/281
See application file for complete search history.

(56) References Cited

U.S. PATENT DOCUMENTS

| 2003/0222974 | A1* | 12/2003 | Yoneyama et al. | 348/14.12 |
| 2005/0131660 | A1* | 6/2005 | Yadegar et al. | 703/2 |
| 2005/0157797 | A1* | 7/2005 | Gaedke | 375/240.24 |
| 2006/0031915 | A1* | 2/2006 | Winder et al. | 725/135 |
| 2006/0146940 | A1* | 7/2006 | Gomila et al. | 375/240.27 |
| 2010/0290526 | A1* | 11/2010 | Tong et al. | 375/240.12 |

OTHER PUBLICATIONS

Video encoder and method of video encoding, wo 2005088980, Jan. 30, 2005.*
International Search Report, PCT/US2007/12312, dated Jan. 16, 2008.

* cited by examiner

*Primary Examiner* — Behrooz Senfi
(74) *Attorney, Agent, or Firm* — Sheridan Ross P.C.

(57) ABSTRACT

A method and system for video compression prediction mode determination is disclosed. For one embodiment of the invention, the frequency domain characteristics (FDCs) of an image block are determined. The FDCs of the image block are compared to the FDCs of each of a number of prediction modes. The prediction mode having FDCs most similar to those of the image block is then determined and selected for encoding the block. For one embodiment of the invention the FDCs of the nine 4×4 prediction modes of the H.264 standard and the FDCs of a 4×4 image block are defined using a frequency domain transform. For one embodiment of the invention, one or more additional prediction modes are evaluated, and of these, the prediction mode resulting in RD optimization is selected for encoding the block.

15 Claims, 4 Drawing Sheets

METHODS AND APPARATUSES FOR VIDEO COMPRESSION INTRA PREDICTION MODE DETERMINATION

FIELD

Embodiments of the invention relate generally to the field of video compression and more methods and apparatuses for providing prediction mode determination.

BACKGROUND

A recently developed conventional video compression technology standard is the H.264 standard developed jointly by the ITU-T Video Coding Experts Group (VCEG) and the Motion Picture Experts Group (MPEG). The H.264 standard is also referred to as MPEG-4 Part 10 and Advanced Video Coding (AVC). H.264 contains a number of features that allow for more effective video compression than previous standards.

One such feature is intra-prediction, where a block can be predicted from the neighboring pixels in the same picture. H.264 baseline profile allows intra-prediction to be done for either 16×16 pixel blocks or 4×4 pixel blocks. Such prediction was not adequately defined in previous standards (e.g., the H.263 standard). The H.264 standard provides four modes for 16×16 blocks and nine modes for 4×4 blocks. The decision as to when to use a 16×16 block or a 4×4 block and which mode to use in either case is not indicated by the standard, but is left to the encoder to decide based on efficiency and performance. Typically, using 4×4 blocks provides better prediction but at reduced efficiency (i.e., a greater number of bits required to signal the intra prediction modes). Distortion and rate are two metrics used to quantify the performance or usefulness of a particular prediction mode. Distortion indicates how close the prediction is to the actual image and rate refers to the number of bits required to encode the image. Optimizing the tradeoff between distortion and rate is referred to as rate-distortion optimization.

One method for determining the best mode is to encode the image as both a 16×16 block and as 16 4×4 blocks, using all of the available modes for each. The best mode is determined through a rate-distortion (RD) optimization calculation of each of the available modes. Therefore, the number of RD calculations required to determine the best luma prediction mode for a 16×16 block is 148 (the number of prediction modes (4) for the 16×16 block plus the number of prediction modes (9) for each of the 16 4×4 blocks comprising the 16×16 block).

Such a scheme is disadvantageous due to the computational complexity for intra prediction mode decisions. This disadvantage has been addressed to some extent in various ways. One such scheme provides an intra mode decision algorithm for determining the optimal mode from among the nine modes for a 4×4 block. Initially, the horizontal prediction mode, vertical prediction mode, and DC prediction mode are evaluated. Then, depending on which of these three modes is determined to be optimal, another two or three associated modes are evaluated.

For example, if upon initial evaluation, the horizontal prediction mode is determined to be optimal relative to the vertical prediction mode and the DC prediction mode, then, the horizontal-up prediction mode and the horizontal-down prediction mode are also evaluated. The optimal mode from among the secondary evaluations is then selected. This method reduces the number of calculations by associating modes, thereby reducing the number of evaluations, for each of the 16 4×4 blocks, from nine to approximately five or six.

Another prior art scheme for reducing the required calculations is based upon making an initial assessment of the 16×16 block; if the 16×16 block meets a threshold level of "smoothness", then 16×16 block mode is selected and no evaluations are conducted for 4×4 block modes. This method allows for a quick determination between the four 16×16 block modes and the nine 4×4 modes. This method provides a substantial reduction in calculations when the 16×16 block meets the arbitrary smoothness threshold, but if not, the number of calculations remains great.

These and other conventional mode determination prediction schemes are non-comprehensive, disjointed, and to some degree arbitrary, and thus do not provide a consistently reliable prediction mode determination technique.

SUMMARY

In accordance with one embodiment of the invention the frequency domain characteristics of an image block are determined. The frequency domain characteristics of the image block are then compared with corresponding frequency domain characteristics of each of a plurality of image encoding prediction modes. The prediction mode having frequency domain characteristics most similar to the frequency domain characteristics of the image block is then determined.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
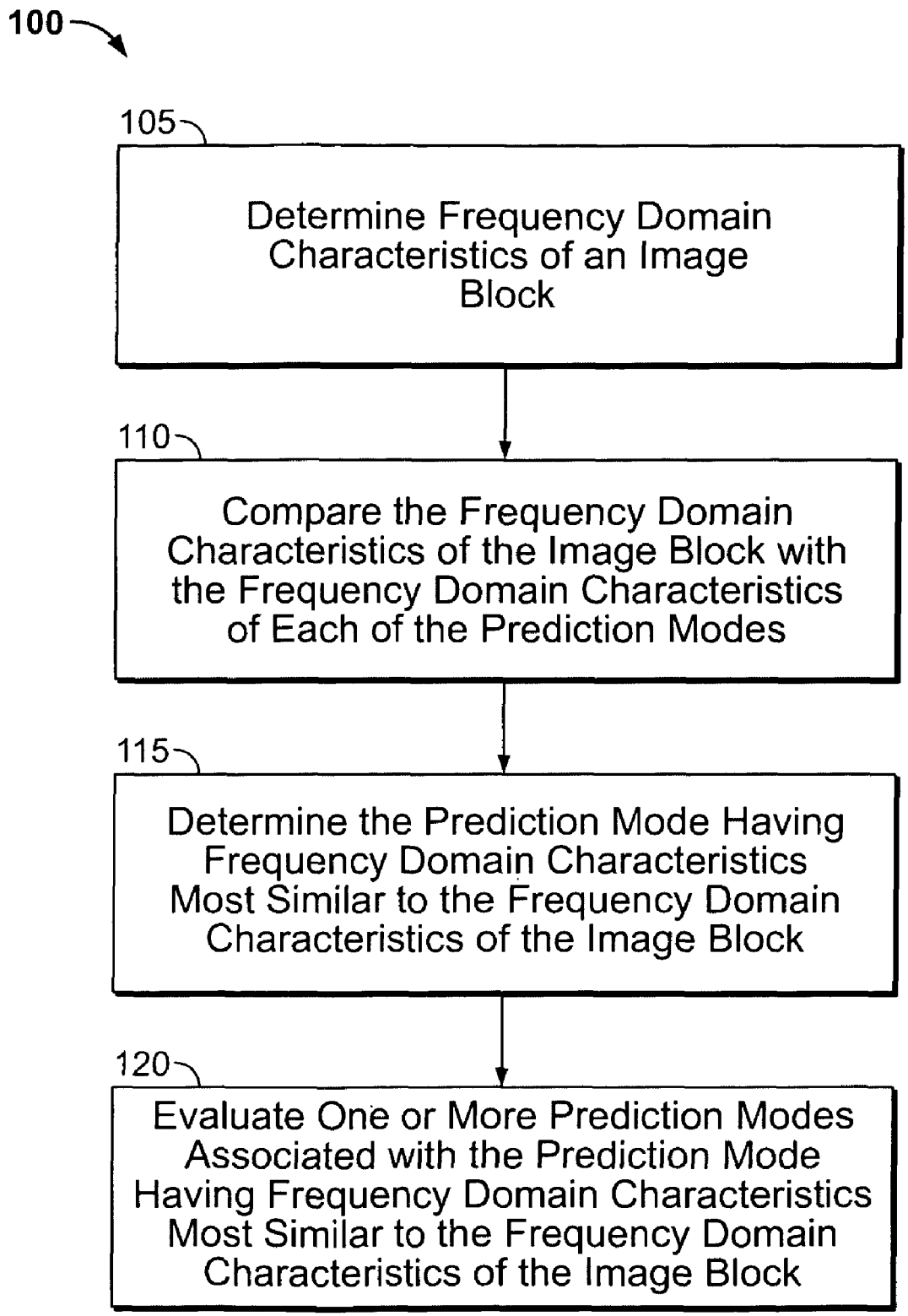
FIG. 1 illustrates a process in which a 4×4/16×16/8×8 mode prediction determination is effected in accordance with one embodiment of the invention.

A method and apparatus for video compression prediction mode determination is disclosed. Embodiments of the invention substantially reduce the number of calculations required to determine a video compression prediction mode. For one embodiment of the invention, the frequency domain characteristics (FDCs) of a 4×4 block to be predicted are determined. The FDCs of the 4×4 block are compared to the FDCs of each of the nine 4×4 prediction modes specified by the H.264 standard. The prediction mode having FDCs most similar to those of the block to be predicted is then determined and selected for encoding the block.

For one embodiment of the invention the FDCs are defined using a Hadamard transform. In other embodiments of the invention, a different frequency domain transform such as a Discrete Cosine Transform (DCT) or a Discrete Fourier Transform (DFT) may be employed to define the FDCs. Whatever definition is adopted, it has to be adopted both for the prediction modes and for the 4×4 block whose mode is being determined.

For one embodiment of the invention, the similarity between the FDC's of the 4×4 block is predicted by looking at the stricture in the frequency (Hadamard, DCT, DFT etc) domain of the 4×4 block and comparing the characteristics of the block with the structure in the frequency domain of the 9 4×4 intra-prediction modes. The structure of the 9 4×4 intra-prediction modes is known apriori. It is not computed at runtime.

For one embodiment of the invention, upon determining the prediction mode having FDCs most similar to those of the image block to be predicted, one or more additional prediction modes are evaluated, and of these, the prediction mode resulting in RD optimization is selected for encoding the block.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Embodiments of the invention are applicable to digital TV, DVD-video, digital cameras, cellular telephones, and many other applications in a variety of settings in which video content is encoded and decoded for transmission and storage.

FIG. 1 illustrates a process in which an intra prediction mode determination is effected from amongst the available modes in accordance with one embodiment of the invention. The 4×4 prediction mode determination is effected using the process shown in FIG. 1 in accordance with one embodiment of the invention. Process 100, shown in FIG. 1, begins at operation 105 in which the FDCs of a block (i.e., a 4×4 block to be predicted) are determined. For one embodiment of the invention the determination of the FDCs of the block are determined by performing a Hadamard Transform of the digital data.

At operation 110 the FDCs of the block are compared with the FDCs of each of the available prediction modes. Included as Appendix A are the nine intra 4×4 prediction modes (modes 0-8) specified by the H.264 standard (Table A) as well as the indicated interpolation for each of the nine prediction modes (Diagram A). Included in appendix C are the four intra 16×16 prediction modes (modes 0-3) The structure of the FDCs of each of the nine intra 4×4 prediction modes is compared to the structure of the FDC of the current block. The structure of the FDCs of each of the nine intra 4×4 prediction modes is shown in Appendix B.

At operation 115 the prediction mode having FDCs most similar to those of the block to be predicted is then determined. As noted above, the similarity is measured by comparing the structure of the block and that of the prediction modes (which is known apriori), in the frequency domain.

At operation 120 one or more additional prediction modes are evaluated to determine the best mode in the RD optimization sense. In the 4×4 block case because the H.264 standard is biased toward prediction modes already determined for adjacent blocks, the RD optimization calculation may indicate a prediction mode other than the prediction mode having a transform matrix most similar to the transform matrix of the 4×4 block (i.e., the prediction mode that has the FDCs most similar to that of the block). This bias is due in-part to the additional bits required to indicate the presently used prediction mode (i.e., mode bits). Typically, such prediction modes will be prediction modes associated with (e.g., having similar attributes to) the prediction mode having a transform matrix most similar to the transform matrix of the 4×4 block. For example, if the horizontal prediction mode is determined to have a transform matrix most similar to the transform matrix of the 4×4 block, then the additional prediction modes of horizontal_down and horizontal_up may be evaluated to determine the best mode in the RD optimization sense.

For one embodiment of the invention, one or more specific prediction modes may be evaluated prior to determining the FDCs of the image block and comparing it to the FDCs of each of the prediction modes. For one embodiment, prediction modes having a relatively high probability of being the most efficient (i.e., the optimal prediction mode in terms of RD optimization) are evaluated prior to the determination and comparisons of the FDCs of the image block as described above. For example, DC mode has been empirically determined to have a relatively high probability of being the optimal mode. Therefore, DC mode may be evaluated for RD optimization initially with the frequency-based most probable prediction mode subsequently determined and evaluated.

As described above, a variety of frequency domain transforms may be used in accordance with alternative embodiments of the invention. Moreover, there are various methods for comparing the FDC of the image block to the FDC of each of the prediction modes.

Included as Appendix B is an exemplary algorithm for effecting a 4×4 prediction mode determination using a Hadamard transform to determine and compare the FDCs of the 4×4 block in accordance with one embodiment of the invention.

As noted, the H.264 standard provides four prediction modes for a 16×16 block as an alternative to the 4×4 prediction modes described above. Embodiments of the invention provide a method for effecting a 16×16 prediction mode determination as well as determining the optimal image block size. Included as Appendix C are the four intra 16×16 prediction modes (modes 0-3) specified by the H.264 standard. For one embodiment of the invention a 16×16 mode determination may be effected as described above in reference to a 4×4 prediction mode determination. For one embodiment of the invention, the FDCs of a 16×16 image block may be determined and compared as described above in reference to FIG. 1. For one embodiment of the invention, the FDCs of a 16×16 block may be determined by aggregating the transform matrices of the 16 4×4 blocks comprising the 16×16 block. Included as Appendix D is an exemplary algorithm for effecting a 16×16 prediction mode determination in accordance with one such embodiment of the invention.

Embodiments of the invention provide a method for determining whether to encode a 16×16 block using a 16×16 prediction mode as opposed to disintegrating the 16×16 block into 16 4×4 blocks and encoding each of these blocks using a 4×4 prediction mode.

Figure 2:
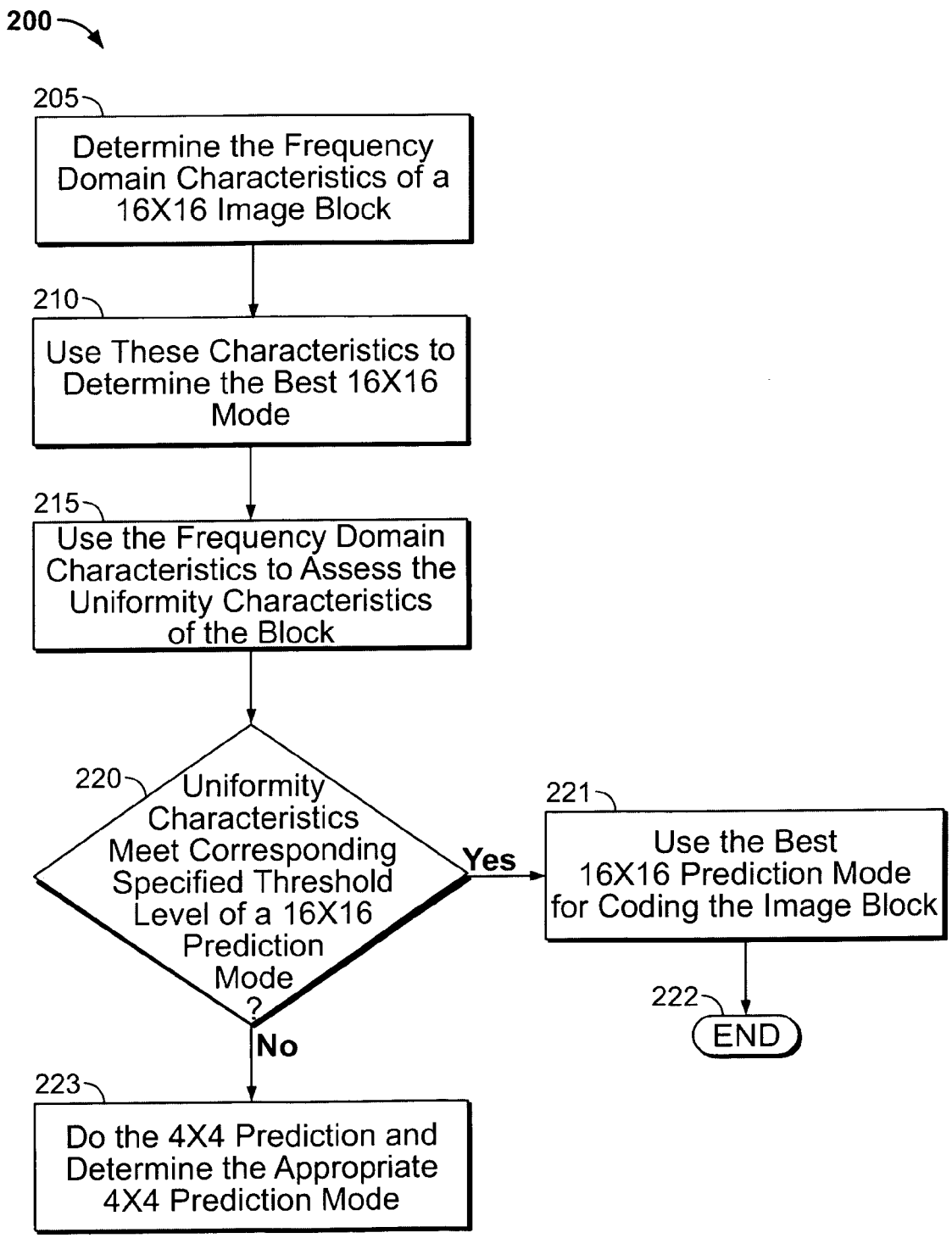
FIG. 2 illustrates a process for indicating when the 16×16 prediction mode determination process is sufficient in accordance with one embodiment of the invention.

FIG. 2 illustrates a process for indicating when the use of a 16×16 prediction mode is sufficient in accordance with one embodiment of the invention. Process 200, shown in FIG. 2, begins at operation 205 in which the FDCs of a 16×16 block are determined. For one embodiment of the invention the FDCs of the 16×16 block are determined using a Hadamard transform of the block. For one embodiment of the invention, the FDCs of the 16×16 block are formed by accumulating the FDCs of the constituent 16 4×4 blocks.

At operation 210, the above determined frequency characteristics are used to determine the best 16×16 intra-prediction mode.

At operation 215, the FDCs of the block are used to assess the uniformity characteristics of the 16×16 block. For one embodiment of the invention, the uniformity is defined with reference to each mode. For one embodiment of the invention, particular frequency characteristics correspond to particular 16×16 prediction modes.

At operation 220 the uniformity characteristics of the 16×16 block are compared to corresponding specified threshold levels. For one embodiment of the invention, the corresponding specified thresholds are determined empirically. If the corresponding specified threshold level is met for a particular 16×16 prediction mode, then the 4×4 prediction mode determination is avoided for the block. Block size is taken as 16×16 (operation 221) and the mode determined as the best 16×16 mode in 210 is taken as the best mode and the process is ended at operation 222.

If, at operation 220 the corresponding specified threshold level for each of the four 16×16 prediction modes is not met, then the 4×4 prediction mode is deemed appropriate at operation 223 and an appropriate 4×4 prediction mode is determined.

As discussed above in reference to FIG. 2, the uniformity of the block is assessed in terms of the FDCs of the block and 4×4 prediction mode and its accompanying calculations are avoided if the block meets specified thresholds. The thresholds may be empirically determined and typically range from 80%-90% of the total block energy.

For one embodiment of the invention the 4×4 prediction mode calculations may be determined unnecessary when the DC energy content of the 16×16 block meets a specified threshold and the 4×4 blocks do not differ to within a specified degree. That is, a relatively high DC energy content would indicate that 4×4 prediction would not produce a significantly lower RD cost than 16×16 prediction. For one embodiment of the invention, uniformity is defined with reference to each mode. For one embodiment of the invention the 4×4 prediction mode calculations may be determined unnecessary when the total horizontal frequency energy content is high compared to other frequencies and the intra16×16 horizontal prediction mode has been determined to be optimal or when the total vertical frequency energy content is high compared to other frequencies and the intra16×16 vertical prediction mode has been determined to be optimal. That is, when a 16×16 block has sufficiently high horizontal or vertical content, then the intra16×16 horizontal prediction mode or intra16×16 vertical prediction mode, respectively, will suffice. For one embodiment of the invention the 4×4 prediction mode calculations may be determined unnecessary when the total 16×16 block energy is sufficiently greater than the best 16×16 mode sum of the absolute differences (SAD) obtained. That is, the total energy of the 16×16 block would likely not be reduced by further operations. Included as Appendix E is a process flow diagram to determine whether a 4×4 intra-prediction mode determination is needed for a 16×16 block.

Figure 3:
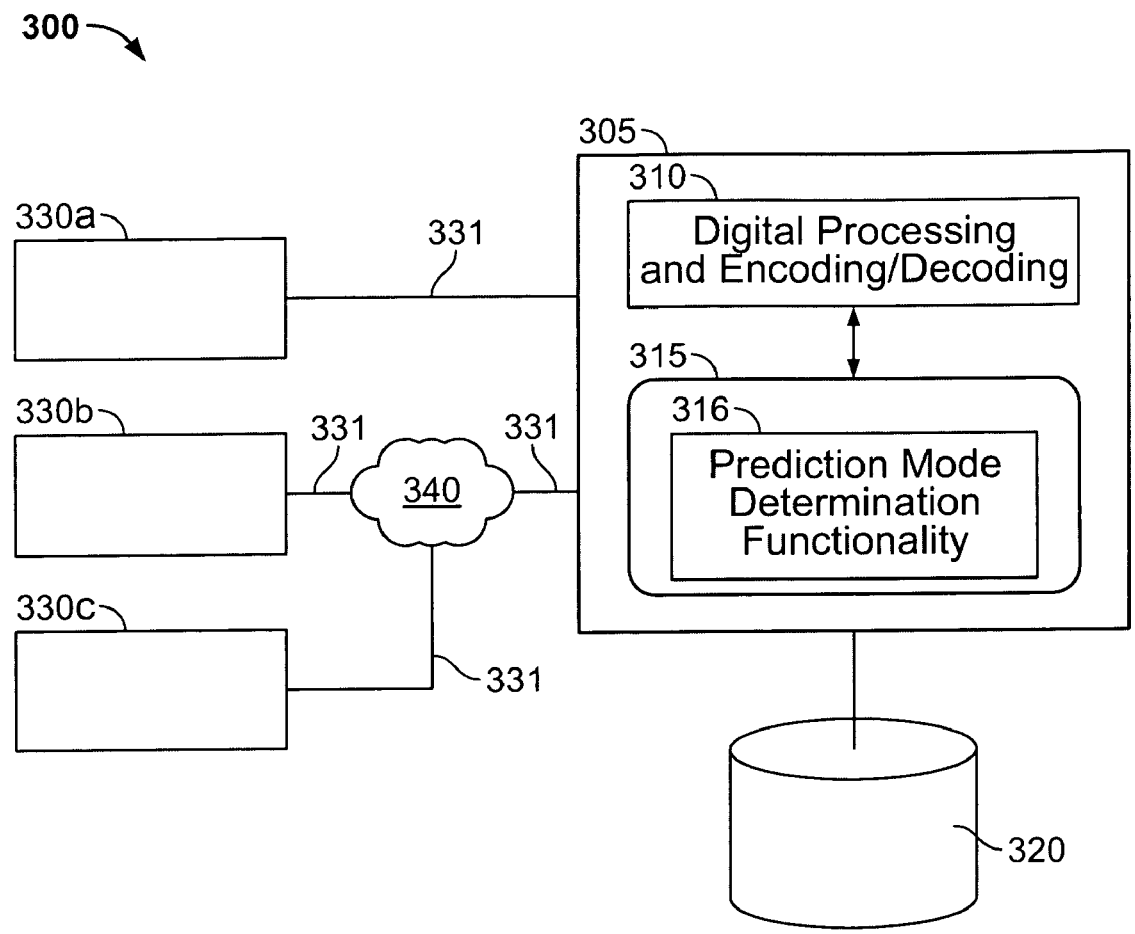
FIG. 3 illustrates a functional block diagram of a system employing video encoding in accordance with one embodiment of the invention.

As discussed above, embodiments of the invention may be employed in a variety of image coding applications. FIG. 3 illustrates a functional block diagram of a system employing video encoding in accordance with one embodiment of the invention. System 300, shown in FIG. 3, includes a digital processing system (DPS) 305 in which video content may be encoded. The DPS 305 may be a network server, personal computer, or other type of digital processing system for encoding and decoding video images. The DPS 305 includes digital processing and encoding/decoding functionality 310 as well as memory device 315. Memory device 315 includes prediction mode determination functionality 316 in accordance with one embodiment of the invention, stored on it.

The DPS 305 accesses video images which may be stored in mass storage device 320. The video images are then encoded as a bitstream file using video compression encoding techniques including the intra prediction technique as described above. The encoded bitstream may then be stored or transmitted to one or more video decoders, shown for example as video decoders 330A-330C, for decoding. A video decoder 330 may be integrated into the DPS 305 or may be included in a remotely located video imaging device and coupled to DSP 305 via wired or wireless transmission media 331.

For example, the encoded video bitstream may be communicated from the DPS 305 to a decoder through any type of communications network through which a plurality of different devices may communicate such as, for example, but not limited to, the Internet, a wide area network (WAN) not shown, a local area network (LAN), an intranet, or the like. For example, as shown in FIG. 3, the DPS 305 is connected to decoders 330B and 330C through Internet 340 which is a network of networks having a method of communicating that is well known to those skilled in the art.

Figure 4:
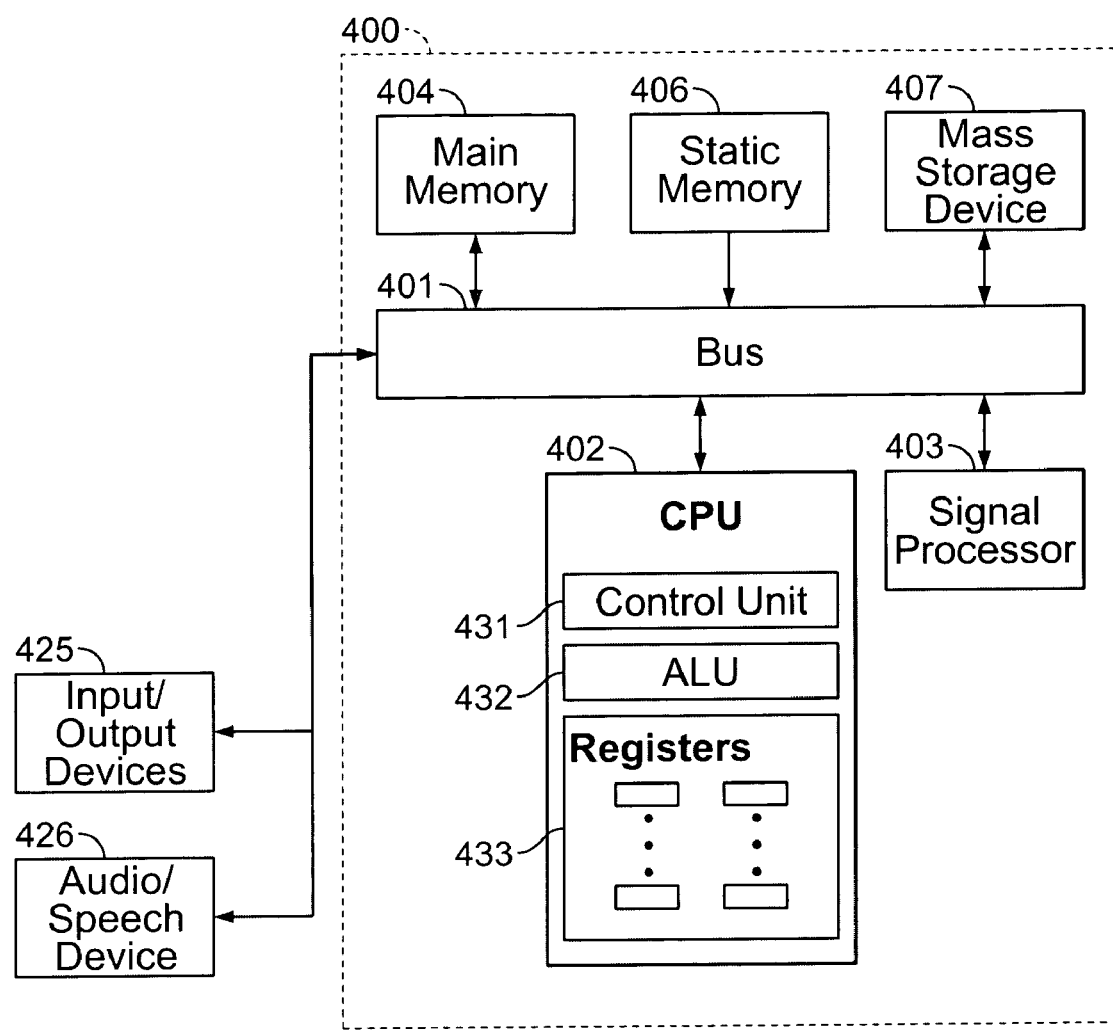
FIG. 4 illustrates a functional block diagram of a digital processing system in accordance with one embodiment of the invention.

FIG. 4 illustrates a functional block diagram of a digital processing system (e.g., DPS 305) in accordance with one embodiment of the invention. The components of processing system 400, shown in FIG. 4 are exemplary in which one or more components may be omitted or added. For example, one or more memory devices may be utilized for processing system 400.

Referring to FIG. 4, processing system 400 includes a central processing unit 402 and a signal processor 403 coupled to a main memory 404, static memory 406, and mass storage device 407 via bus 401. In accordance with an embodiment of the invention, main memory 404 may store a selective communication application, while mass storage devise 407 may store various digital content as discussed above. Processing system 400 may also be coupled to input/output (I/O) devices 425, and audio/speech device 426 via bus 401. Bus 401 is a standard system bus for communicating information and signals. CPU 402 and signal processor 403 are processing units for processing system 400. CPU 402 or signal processor 403 or both may be used to process information and/or signals for processing system 400. CPU 402 includes a control unit 431, an arithmetic logic unit (ALU) 432, and several registers 433, which are used to process information and signals. Signal processor 403 may also include similar components as CPU 402.

Main memory 404 may be, e.g., a random access memory (RAM) or some other dynamic storage device, for storing information or instructions (program code), which are used by CPU 402 or signal processor 403. Main memory 404 may store temporary variables or other intermediate information during execution of instructions by CPU 402 or signal processor 403. Static memory 406, may be, e.g., a read only memory (ROM) and/or other static storage devices, for storing information or instructions, which may also be used by CPU 402 or signal processor 403. Mass storage device 407 may be, e.g., a hard disk drive or optical disk drive, for storing information or instructions for processing system 400.

General Matters

Embodiments of the invention include methods for video compression intra-prediction mode determination that substantially reduce the number of calculations required to determine a video compression intra-prediction mode. For one embodiment of the invention, the FDCs of an image block to be predicted are determined. The FDCs of the image block are compared to the FDCs of each of a number of prediction modes. The prediction mode having FDCs most similar to those of the image block to be predicted is then determined and selected for encoding the block.

For one embodiment of the invention the FDCs of the nine 4×4 prediction modes of the H.264 standard and the FDCs of a 4×4 image block are determined using a Hadamard transform. In other embodiments of the invention, a different frequency domain transform such as a Discrete Cosine Transform (DCT) or Discrete Fourier Transform (DFT) may be employed to determine FDCs of both the prediction modes and the 4×4 block to be predicted.

For one such embodiment of the invention, the structure of the FDCs of the current block are compared with the structure of the FDCs of the available prediction modes for similarity. The structures of the FDCs of the available prediction modes are known apriori and are shown in appendix B. For the structural similarity comparison, no operation is done on the prediction matrix at runtime.

For one embodiment of the invention, upon determining the prediction mode having FDCs most similar to those of the image block to be predicted, one or more additional prediction modes are evaluated, and of these, the prediction mode resulting in RD optimization is selected for encoding the block.

For one embodiment of the invention, the invention has been used for intra 4×4, 16×16 mode decision in the baseline or main profiles of H.264. In other embodiments, the invention can be extended to the high profile of H.264 where the 8×8 intra prediction modes are employed along with the Intra 16×16 and intra 4×4 modes.

In one such embodiment where the invention is extended to the high profile, the 8×8 intra prediction can be performed based on 8×8 FDCs as in FIG. 1. The 8×8 FDCs can be computed by computing the frequency characteristics of the whole 8×8 block or can be calculated from the frequency characteristics of the 4 4×4 blocks that comprise the 8×8 block.

Embodiments of the invention have been described as including various operations. Many of the processes are described in their most basic form, but operations can be added to or deleted from any of the processes without departing from the scope of the invention. For example, as described in reference to FIG. 1, an embodiment of the invention provides a method for intra-prediction mode determination in which upon determining the prediction mode having FDCs most similar to those of the image block to be predicted, one or more additional prediction modes are evaluated as candidate prediction modes. In alternative embodiments of the invention no additional candidate prediction modes are evaluated.

Furthermore, while embodiments of the invention have been described in regard to a transition mechanism from a 16×16 block size to a 4×4 block size, it will be apparent to those skilled in the art, that embodiments of the invention are equally applicable transitions mechanisms for alternative block sizes. For example, embodiments of the invention are applicable to 16×16 block size to 8×8 block size transitions or to 8×8 block size to 4×4 block size transitions.

Moreover, although embodiments of the invention are described in the context of analyzing a larger block size (e.g., 16×16 block size) to determining whether or not to perform intra mode estimation at a smaller block size (e.g., 4×4 block size), alternative embodiments may be used to analyze smaller block sizes (e.g., 4×4 block size) to determine whether or not to perform intra mode extimation at a larger block size (16×16 block size).

The operations of the invention may be performed by hardware components or may be embodied in machine-executable instructions, which may be used to cause a general-purpose or special-purpose processor or logic circuits programmed with the instructions to perform the operations. Alternatively, the steps may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD- and ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A computer implemented method comprising:
    determining the frequency domain characteristics of a 16×16 pixel image block;
    comparing the structure of the frequency domain characteristics of the 16×16 pixel image block with corresponding structure of the frequency domain characteristics of each of a plurality of intra 16×16 image encoding prediction modes specified by a video compression standard; and
    determining an indicated prediction mode, the indicated prediction mode having frequency domain characteristics most similar to the frequency domain characteristics of the 16×16 pixel image block;
    determining if the frequency domain characteristics of the 16×16 pixel image block are within a specified threshold value of similarity corresponding to the indicated prediction mode;
    encoding the 16×16 pixel image block using the indicated prediction mode got by comparing the frequency domain characteristics (FDCs) of the 4 16×16 modes with the FDCs of the current macroblock, if the frequency domain characteristics of the 16×16 pixel image block are within the specified threshold of similarity; and disintegrating the 16×16 pixel image block into a corresponding number of smaller image blocks if the frequency domain characteristics of the 16×16 pixel image block are not within the specified threshold value of similarity.

2. The method of claim 1 further comprising:
encoding the image block using the indicated prediction mode.

3. The method of claim 1 further comprising:
evaluating one or more additional prediction modes associated with the indicated prediction mode;
effecting a rate-distortion optimization among the indicated prediction mode and the additional prediction modes; and
encoding the image block using the prediction mode determined optimal by the rate-distortion optimization.

4. The method of claim 3 wherein the frequency domain characteristics of the image block are determined using a Hadamard Transform.

5. The method of claim 1 wherein the video compression standard is the H.264 standard.

6. A system comprising:
a processor for encoding video images; and
a memory coupled to the processor having stored thereon an encoding application that:
determines the frequency domain characteristics of a 16×16 pixel image block,
compares the structure of the frequency domain characteristics of the 16×16 pixel image block with corresponding structure of the frequency domain characteristics of each of a plurality of intra 16×16 image encoding prediction modes specified by a video compression standard, and
determines an indicated prediction mode, the indicated prediction mode having frequency domain characteristics most similar to the frequency domain characteristics of the 16×16 pixel image block;
determines if the frequency domain characteristics of the 16×16 pixel image block are within a specified threshold value of similarity corresponding to the indicated prediction mode;
encodes the 16×16 pixel image block using the indicated prediction mode got by comparing the frequency domain characteristics (FDCs) of the 4 16×16 modes with the FDCs of the current macroblock, if the frequency domain characteristics of the 16×16 pixel image block are within the specified threshold of similarity; and
disintegrates the 16×16 pixel image block into a corresponding number of smaller image blocks if the frequency domain characteristics of the 16×16 pixel image block are not within the specified threshold value of similarity.

7. The system of claim 6 wherein the encoding application encodes the image block using the indicated prediction mode.

8. The system of claim 6 wherein the encoding application evaluates one or more additional prediction modes associated with the indicated prediction mode, effects a rate-distortion optimization among the indicated prediction mode and the additional prediction modes, and encodes the image block using the prediction mode determined optimal by the rate-distortion optimization.

9. The system of claim 8 wherein the frequency domain characteristics of the image block are determined using a Hadamard Transform.

10. The system of claim 6 wherein the video compression standard is the H.264 standard.

11. A nontransitory machine-readable medium having instructions stored thereon, which when executed by a processor, cause the processor to perform a method, the method comprising:
determining the frequency domain characteristics of a 16×16 pixel image block;
comparing the structure of the frequency domain characteristics of the 16×16 pixel image block with corresponding structure of the frequency domain characteristics of each of a plurality of intra 16×16 image encoding prediction modes specified by a video compression standard; and
determining an indicated prediction mode, the indicated prediction mode having frequency domain characteristics most similar to the frequency domain characteristics of the 16×16 pixel image block;
determining if the frequency domain characteristics of the 16×16 pixel image block are within a specified threshold value of similarity corresponding to the indicated prediction mode;
encoding the 16×16 pixel image block using the indicated prediction mode got by comparing the frequency domain characteristics (FDCs) of the 4 16×16 modes with the FDCs of the current macroblock, if the frequency domain characteristics of the 16×16 pixel image block are within the specified threshold of similarity; and
disintegrating the 16×16 pixel image block into a corresponding number of smaller image blocks if the frequency domain characteristics of the 16×16 pixel image block are not within the specified threshold value of similarity.

12. The machine-readable medium of claim 11 wherein the method further comprises:
encoding the image block using the indicated prediction mode.

13. The machine-readable medium of claim 11 wherein the method further comprises:
evaluating one or more additional prediction modes associated with the indicated prediction mode;
effecting a rate-distortion optimization among the indicated prediction mode and the additional prediction modes; and
encoding the image block using the prediction mode determined optimal by the rate-distortion optimization.

14. The machine-readable medium of claim 13 wherein the frequency domain characteristics of the image block are determined using a Hadamard Transform.

15. The machine-readable medium of claim 11 wherein the video compression standard is the H.264 standard.

* * * * *